(No Model.) 4 Sheets—Sheet 2.
W. R. KIRK.
RAILWAY SIDING.
No. 591,977. Patented Oct. 19, 1897.
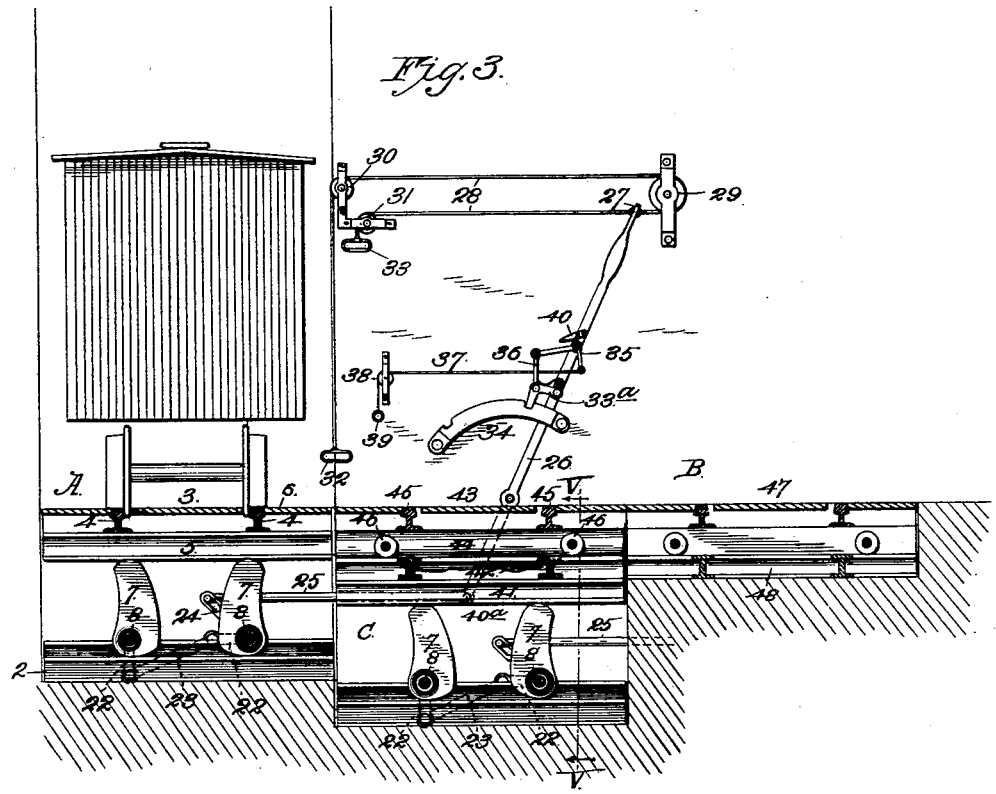
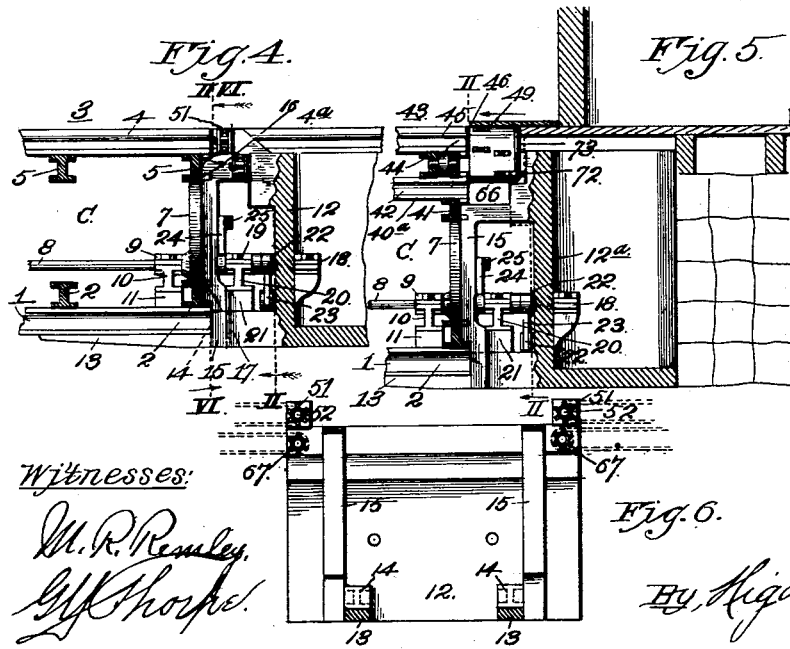
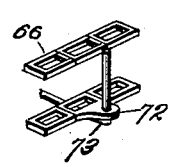
Witnesses:
M. R. Remley
G. F. Thorpe
Inventor:
W. R. Kirk
By Higdon & Higdon
Attys

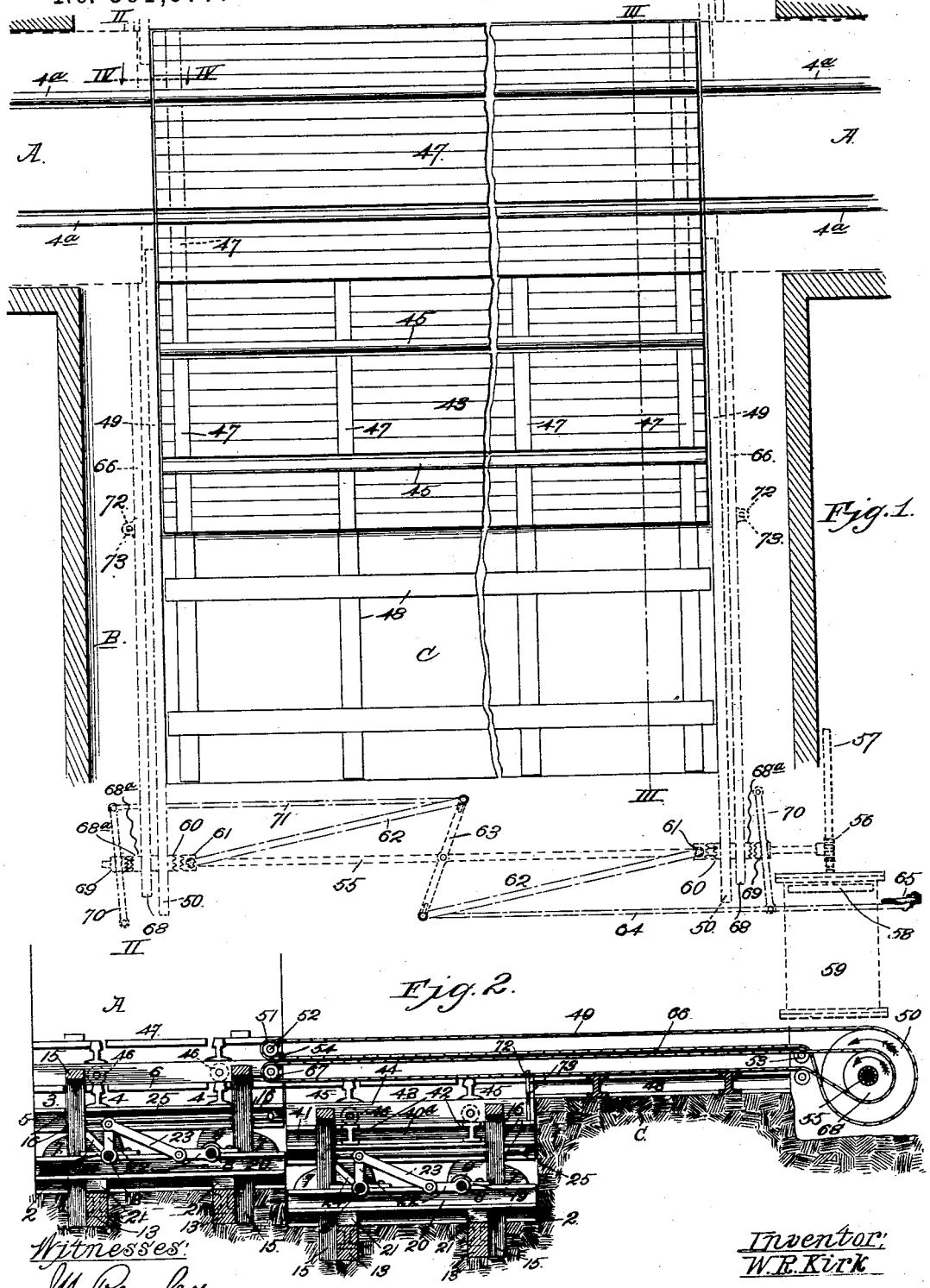

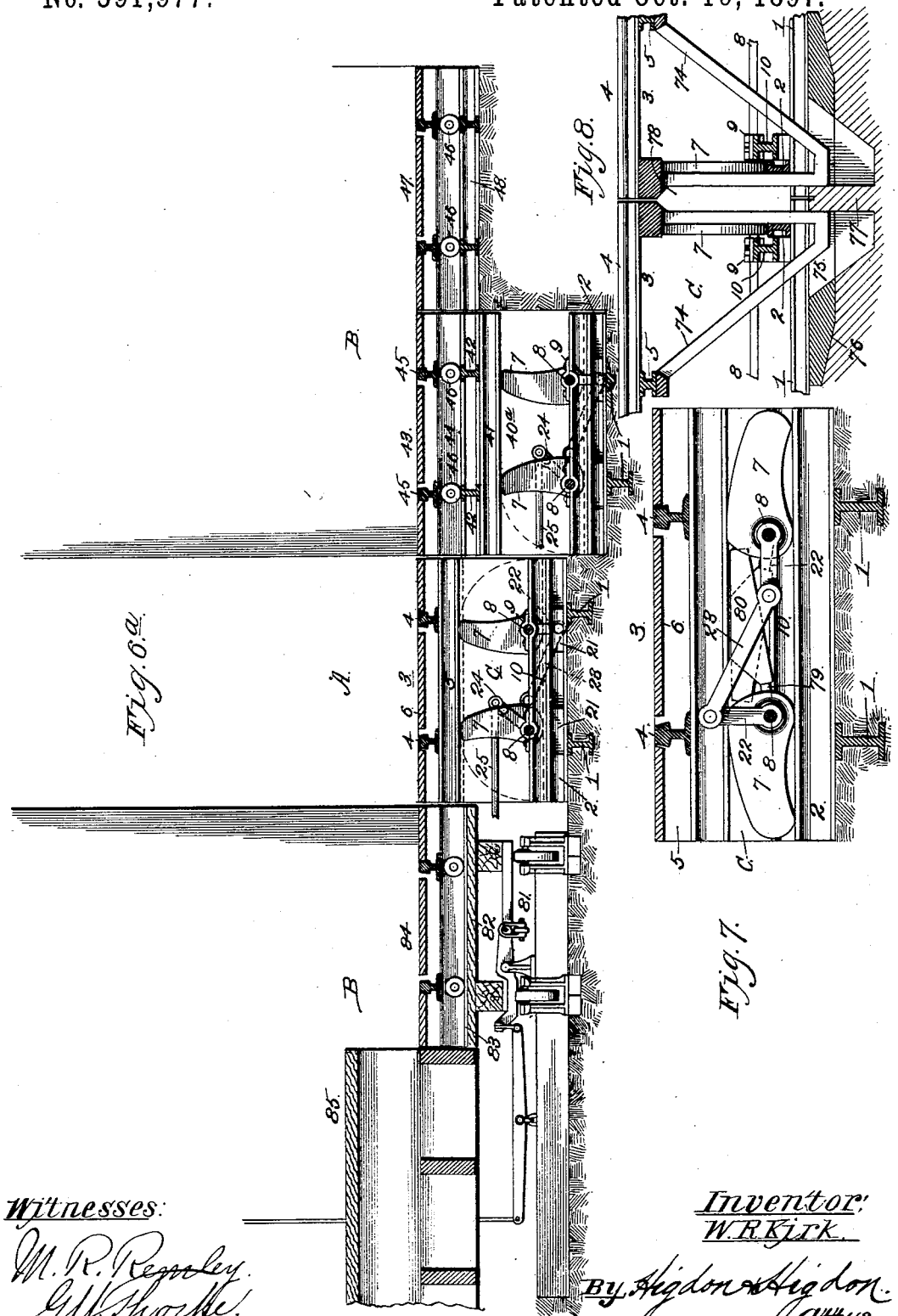

(No Model.) 4 Sheets—Sheet 4.
W. R. KIRK.
RAILWAY SIDING.
No. 591,977. Patented Oct. 19, 1897.
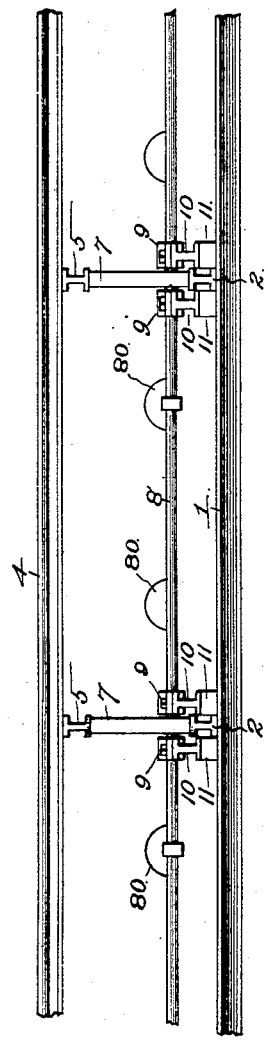
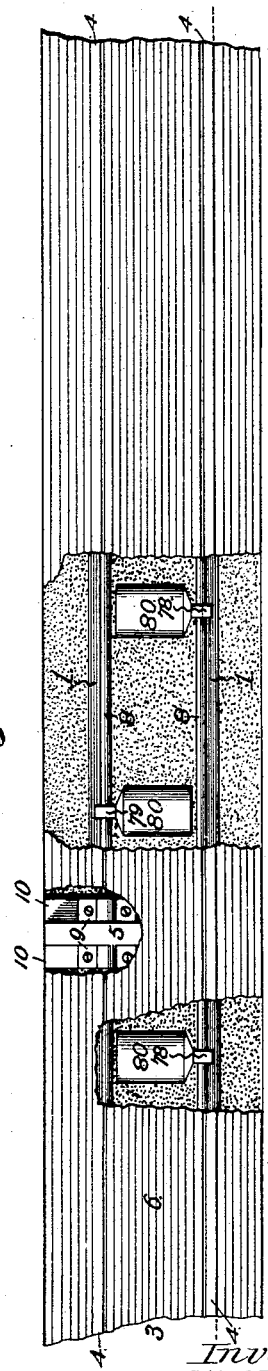
Witnesses:
Inventor:
W. R. Kirk.

UNITED STATES PATENT OFFICE.

WALLACE R. KIRK, OF KANSAS CITY, MISSOURI.

RAILWAY-SIDING.

SPECIFICATION forming part of Letters Patent No. 591,977, dated October 19, 1897.

Application filed February 19, 1897. Serial No. 624,092. (No model.)

*To all whom it may concern:*

Be it known that I, WALLACE R. KIRK, of Kansas City, Jackson county, Missouri, have invented certain new and useful Improvements in Railway-Sidings, of which the following is a full, clear, and exact description, reference being had to the accompanying drawings, forming a part thereof.

This invention relates to railway-sidings, and more especially is supplemental to and an improvement on the invention of like character embodied in my Patent No. 553,247, granted January 21, 1896.

The primary object of the present invention is to produce means whereby a plurality of cars may be successively moved or shunted at right angles from the main-line track in a horizontal plane in the same direction, or in opposite directions, and within a single car length, such movement being in multiples of the width of a car, or rather of its support, that said shunted cars may occupy at all times a position parallel with the main line and an equal distance apart, and may completely fill the space allotted for their reception.

A further object of the invention is to provide for weighing cars thus shunted easily and quickly by disposing a scale-supported platform to receive the cars when shunted to the requisite point.

Other objects of the invention will hereinafter appear and be pointed out in appended claims.

Referring to said accompanying drawings, Figure 1 represents a plan view of a railway-siding embodying my invention. Fig. 2 represents a cross-sectional view taken on the line II II of Figs. 1, 4, and 5. This section is irregular and cannot be shown clearly by dotted lines in any one figure. Fig. 3 represents a cross-sectional view taken on the line 3 3 of Fig. 1, except that the various platforms occupy their normal positions, and mechanism is shown whereby one of the platforms may be raised or lowered. In said figure also the main-track platform supports the car. Fig. 4 is a longitudinal section taken on the line IV IV of Fig. 1. Fig. 5 is a longitudinal section taken on the line V V of Fig. 3. Fig. 6 is a sectional view taken on the line VI VI of Fig. 4. Fig. 6ª is a vertical cross-section of a siding provided with a scale-supported platform at the opposite side of the main track, whereby the cars may be weighed, if desired. Fig. 7 is a cross-sectional view, on an enlarged scale, of the central or main-track platform in its lowered position. Fig. 8 is a modification hereinafter described. Fig. 9 is a longitudinal section of the central or main-track platform. Fig. 10 is a plan view of the same, partly broken away. Fig. 11 is a detail perspective view which shows clearly the relation between the rods carried by and the chains which cause the lateral movement of one of the platforms or sidings embodied in this invention.

In said drawings, A designates an alley-way or other confined space between buildings located in a wholesale district, and B represents an offsetting space which communicates with said alley-way and exceeds by a few feet, possibly, the length of a car. In depth it may exceed slightly two or more cars, as is found most convenient for the transaction of business by the adjacent house.

For the length of a car a trench C is dug, said trench extending from the opposite side of the alley-way back into the offset in said building the requisite distance. It is not, however, of uniform depth, as will hereinafter appear.

In the bottom of the trench and in the alley-way a permanent and substantial structure of wood or of metal is laid, said structure being composed of longitudinal beams 1 and transverse beams 2. The transverse beams 2 of this structure should be of iron or steel. Said structure is preferably embedded in a concrete foundation in order to insure its stability. Superposed with relation to this framework is a table or platform 3, consisting of longitudinal track-rails 4 and cross-beams 5. In order that wagons may pass conveniently through the alley, this platform, which occupies the plane of the ground, is preferably boarded up between the longitudinal track-rails, as shown at 6. Supporting said platform are a number of cams 7, of about the configuration illustrated. These cams are arranged in pairs, and are adapted to move a distance of about ninety degrees. When vertical, they support the platform in its elevated position, and when horizontal they support it in its lowered position. Said cams are mounted on parallel longitudinal shafts 8, journaled in bearings 9 upon the transverse rails 10, which rails are arranged at intervals throughout the length of the siding, and are preferably mounted upon blocks 11. At each end of said platform, and also embedded in the ground, is a casting 12, provided with a pair of forwardly-projecting arms 13, upon which rest the ends of the beams, so as to afford a more substantial and stable support therefor. Said arms are also provided with vertical shoulders 14, against which the ends of said beams abut, that they may have no longitudinal or creeping movement. Said castings are also provided each with a pair of vertical guide-ribs 15, which engage vertically-alined notches 16 in the end cross-beams 5 of the platform and the notches 17 in the end cross-beam 2 of the lower or stationary structure. Said ribs are provided with openings, in which operate certain mechanism to be hereinafter described, said mechanism being mounted upon the shafts 8, which bridge said openings and are journaled at their ends in bearings 18 of said castings 12. Said shafts are also journaled in bearings 19 of the transverse beams 20, extending from the opening of one rib to that of the other of each casting, and mounted upon the blocks 21 upon or formed integral with the arms 13 of said castings. Mounted rigidly upon said shafts 8, but set quartering to each other, are crank-arms 22, and said crank-arms are connected at each end of the siding by a link 23. At one end of the siding one of said shafts also is provided with a slotted crank-arm 24, pivotally connected to a link 25, whereby said arm may be caused to swing the cams outwardly or inwardly, and thereby lower or elevate the platform 3.

The link-rod 25 may be operated by means of a lever 26, suitably mounted at one end of the siding, and connected, as at 27, at its upper end to a cable 28, which cable engages the guide-pulley 29 and the pulleys 30 and 31, said pulleys being suitably supported in brackets, as shown, or in any other suitable manner. Secured to the end of the said cable in any suitable manner are the handles 32 and 33.

34 designates a notched sector, also suitably supported, and extending parallel to the plane of the movement of the lever. $33^a$ designates a spring-actuated dog carried by said lever and adapted to engage one or another of the notches of said sector.

35 designates an inverted bell-crank, which is pivotally linked, as at 36, to the dog, and attached to the pull-cord 37, which cord extends over the guide-pulley 38, suitably supported. It is provided with a handle 39 at its lower end.

In practice, supposing the platform 3 to be elevated, as shown in Fig. 3, and it be desired to lower said platform, it is only necessary to grasp the handle 39, and, pulling upon the cord 37, trip the dog from engagement with the sector 34. The crank-arm 40, secured to said lever, limits the movement of said bell-crank, and thereby the upward movement of the dog $33^a$, that it may always be ready for reëngagement with the sector. At the same time the handle 33 is grasped, and the lever pulled forward until the dog $33^a$ engages the advanced notch of the sector and locks it from further movement. This operation causes the movement of the slotted crank-arm 24, which imparts motion in turn to the crank-shafts 8, and moves the cams to a horizontal position, as shown clearly in Fig. 7. As the cams swing downwardly to such position the platform, by gravity, moves downward also, being supported all the time by the cams. The object of the depression of the said platform will be hereinafter explained.

At the side of the stationary structure represented by cross-beams 1 and 2, but in a lower plane than said structure, is a similar structure, its parts being correspondingly numbered. It is also supported at each end by means of a casting $12^a$, corresponding to but of greater height than the casting 12. Said casting $12^a$ is provided, like the casting 12, with guide-ribs 15, and also provides a bearing for the shafts 8, corresponding in function to the shafts 8 hereinbefore described. Said shafts are also journaled in bearings 9, upon cross-beams 10, mounted upon blocks 11 and 12, as before, and said shafts also carry cams 7, like those already described. The ribs of said casting, however, do not extend to its upper surface, but terminate some distance short thereof. The platform $40^a$, consisting of transverse beams 41 and the longitudinal beams 42, is supported upon the said cams 7, and the end beams 41 are notched at their outer sides, as before explained with reference to the end beams 5, in order that said platform, as it is raised or lowered, shall reciprocate in a direct vertical plane. Mounted upon said platform is a second platform 43, this platform consisting of the transverse rails 44 and the longitudinal track-rails 45. The transverse rails 44, or some of them, are arranged in pairs, as shown clearly in Fig. 5, and are provided with rollers 46 between them, which rest and are adapted to roll upon the upper surface of the platform $40^a$ or the platform 3. Said platforms, in order to accommodate this travel upon them at times of the platform 43, are preferably provided with transverse wear-strips 47, having their upper surfaces in the plane of the upper surfaces of the track-rails 45. These wear-strips, supported in any suitable manner, may be replaced by transverse eye-beams if desired. The latter construction probably would be the best, as it would be stronger, more durable, and less liable to get out of order than wear-strips, as such eye-beams would form practically a substantial part of the platform proper. The arrangement of mechanism in this side trench is such that when its cams 7 are lowered or moved to their horizontal positions the upper surface of the platform 43 will occupy the same plane as the upper surface of the platform 3 when it is depressed, in order that a third platform 47, parallel with the aforesaid platforms, may be shifted in a horizontal plane from its position at one side of the platform 43, clear across said platform and upon the depressed platform 3, such movement being in a direction at right angles to the longitudinal disposition of the platforms and within the length of a single platform. This platform 47 is of precisely the same construction as the platform 43, and therefore need not be described in detail. Like said platform 43 it is provided with rollers, which rest upon the transverse beams 48 of a stationary or foundation structure embedded, like the stationary structures hereinbefore described, in concrete or otherwise rigidly and permanently secured in position. It will thus be seen that by depressing the platforms 3 and 43 the platform 47 may be caused to assume a position upon the depressed platform 3, and with its longitudinal track-rails in alinement and forming temporarily a continuation of the main track, as shown clearly in Figs. 1 and 2, such platform being also boarded up between the rails, that wagons or other vehicles may pass through the alley when in such transposed position. A train may now pass into the alley and stop with the car to be shunted upon said platform 47. The car is then uncoupled from the others, and the platform 47 again moved back to its original position, carrying the car with it, such movement taking place at right angles from the main line or the alley-way within the length of a car and in a direct horizontal plane. If it be now desired to shunt a second car from the main track into said offset of the building, the platform 43, while in its elevated position, is caused to move laterally within a car length and in a horizontal plane until it rests upon the depressed platform 3. The train is now manipulated until the second car is upon said platform, and said platform 43 moved back to its original position upon the platform 40ª, such movement also taking place in a direct horizontal plane at right angles from the main line and within a car length. The lever 26 is then operated to elevate the platform 3, and it is held reliably in such position by the cams 7, and forms a continuation or part of the main-line track. To shift said shunted cars back to the alley-way and couple them again to other cars, it is necessary to reverse the operations just described—that is to say, the platform 3 is first depressed to permit the platform 43, with its burden or car, to be moved out upon the main line and moved away. The platform 43 is then caused to assume its original position and its proper controlling-lever, (not shown,) like the lever 26, is operated to depress it, the platform 3 also remaining in its depressed position. The platform 47, with its burden, is then moved laterally until it forms a continuation or part of the main line of travel. After its car has been removed it is also caused to assume its original position, and the platforms 3 and 43 reëlevated, so as to maintain the level of the alley when the car-shunting operation is not in progress, and thus avoid accidents. The platforms 43 and 47, of course, may be shifted or moved laterally by various mechanisms. The style of mechanism that I prefer to show, however, in this connection as the simplest, so as not to unnecessarily complicate the drawings or description, is of the endless-chain type, one chain being provided at each end of each laterally-movable platform—that is to say, 49 designates a pair of parallel endless chains which engage large sprocket-wheels 50 inward or rearward of the platform 47, and also engage small sprocket-wheels 51, journaled upon stud-shafts 52, projecting longitudinally, with respect to the platforms, from the upper corners of the castings 12 to the opposite ends of the main-track platform 3. Said sprocket-wheels are arranged at the upper corners of the castings 12, as shown in Fig. 6, but it is to be understood, of course, that the sprocket-wheels will not be used at both upper corners of the casting unless laterally-movable platforms corresponding to the platforms 43 and 47 are employed at both sides of the main-line-track platform. This, of course, will be done where two dealers at opposite sides of the alley, and having opposing properties, wish the same transportation facilities. The chains 49 may be guided and tensioned, of course, by means of rollers 53, in order that both sections of chains may extend parallel and horizontally for a distance slightly exceeding at least the width of the two platforms 43 and 47, as shown clearly in Figs. 1 and 2. The lower strand of said chains will be permanently and positively connected, as at 54, to the outer margin of the platform 47, as shown in Fig. 2, in order that said platform may be pulled back and forth as the chain is operated in one direction or the other by means of the rotation of the longitudinal shaft 55, upon which said sprocket-wheels 50 are loosely mounted. In order to cause the operation of said shaft, it is provided at one end with a cog-pinion 56, engaged by a rack-bar 57, secured to and forming a part of the stem or piston 58 of the steam or hydraulic cylinder 59. The movement of said piston is controlled in the usual manner, and as the mechanism for operating it forms no part of this invention it is not illustrated. In order to impart rotary motion from the shaft to said large sprocket-wheels, the latter are provided with clutch-sections 60, to be engaged by the clutch-section 61, mounted slidingly and non-rotatably upon the shaft 55. Said clutch-sections are pivotally connected by means of links 62 to the rock-lever 63, and said lever at one end is connected by means of a pull-rod 64 to a hand-lever 65, the proper manipulation of which slides said clutch-sections 61 into or out of engagement with the clutch-sections 60, and thereby causes the rotation of said sprocket-wheels 50 or stops their rotation.

Arranged outward of and in a lower plane than the chains 49 are a pair of similar chains 66. These chains engage sprocket-wheels 67, mounted upon stub-shafts of the casting 12, as shown clearly in Fig. 6, also. At their opposite ends they engage sprocket-wheels 68, of half the circumference of the sprocket-wheels 50, also mounted loosely upon the shaft 55, and provided also with clutch-sections 68$^a$, adapted to be engaged by the sliding clutch-sections 69 of the levers 70, which levers are also pivotally connected by means of the rod 64 and the rod 71 to the opposite ends of the rock-lever 63, so that by the proper manipulation of the hand-lever 65 hereinbefore described the clutch-section 69 will be thrown into engagement with the clutch-sections 68$^a$, and thereby cause the rotatable movement of said sprocket-wheels and the operation of the chains 66. In order that the operation of said chains may move the platform 43 upon the depressed platform 3, or back from said platform 3 to its original position upon the platform 40$^a$, and also to accommodate the vertical movement of said platform 43 as it is depressed to permit the platform 47 to pass over it in one direction or the other, or is reëlevated from such depressed position, I provide the lower strands of said chains 66 with the perforated ears 72, preferably at their outer sides, so as not to conflict with the chains 49, through which extend vertically upward rods 73, secured rigidly at their lower ends to the base portion or bottom of said removable platform 43 at the corners adjacent to the platform 47 when in its natural normal position. By this arrangement it is obvious that said platform 43 may be vertically raised or lowered without affecting the chains in the least, because the rods 73 play loosely through the perforated ears 72, and it is equally obvious that said platform, when elevated, may be moved horizontally over upon the depressed platform 3, or back again to its original position, owing to the fact that the chain has a positive engagement with said perforated ears, as shown most clearly in Fig. 11. It will be observed that when the platform is depressed the upper ends of the rods 73 just project through said ears 72, and that when said platform is elevated said chain engages said rods near their lower ends, and adjacent to the platform, the upper ends of said rods being about in the plane or preferably slightly below the upper surface of said platform. When the power of the chain is applied to move said platform, it is obvious, therefore, that the strain upon said rods is applied where it is strongest—viz., near its point of connection with the platform—and consequently a construction such as that shown can be made practical, though it is to be understood, of course, that I in this connection simply wish to cover broadly a connection between the platform and the chain, which will permit the latter to move the platform when it is elevated, and will permit the platform to rise or fall independently of the chain when desired.

From the above construction and arrrangement of mechanism for operating the platforms 43 and 47—that is, for moving them at right angles to the main track and in a horizontal plane at all times—it is obvious that only one of said platforms can be moved at a time and that it depends on the position of the hand-lever 65 which of said platforms would be operated. In other words, when the lever 65 is at one extremity of its stroke the clutch-sections 60 and 61 are in engagement, and the platform 47 will be moved back or forth accordingly as the stroke of the piston is in one direction or the other, and that when said lever is thrown to its opposite position the clutch-sections 60 and 61 will be disengaged and immediately afterward the clutch-sections 68$^a$ and 69 will engage, and thereby impart movement from the rotary shaft to the chain 66 and consequently move the platform 43 back or forth accordingly as the piston is moving in one direction or the other. To prevent any accidental movement of said platforms, or to prevent any accidental movement of and injury to said chains when the platforms are not in positions to be moved, said lever 65 may be caused to assume the position shown in Fig. 1, with all of the clutch-sections out of engagement, as shown clearly. When so positioned, it is impossible for the platforms to be accidentally moved in one direction or the other, as will be readily understood.

In the practical construction of this apparatus the ends of the main track 4$^a$, adjacent to the ends of the movable platform 3, are supported upon a firm and substantial foundation construction in the form of the heavy castings 12, as hereinbefore explained, and said castings are preferably formed alike at each end. These castings are also preferably about three feet in length—about the thickness of a party-wall between two large buildings—and consequently occupies what might be termed "neutral ground." This construction is provided in order that one casting may subserve the same ends for the platforms of two adjoining property owners. If one property owner does not wish to use this apparatus when it is installed by his neighbor, the latter's apparatus need not be disturbed when the former puts one in, as he can connect onto his end of the casting 12 without disturbing the mechanism connected to the opposite end of said casting. If, however, two properties abut without an intervening party-wall, and the three feet of space more or less is necessary, they can dispense with the castings 12 and use in lieu thereof castings such as shown in Fig. 8. These castings are numbered 74, and are preferably of skeleton form, and they are attached to and form what might be termed the "end legs" of the top or movable platforms 3. They depend into and are guided in their vertical movement through the longitudinal slots 75 of a bed or base plate 76, and the platforms are protected from end-thrust movement by bearing against the partition 77 and against the grooved or notched transverse beams 2 of the base or foundation structure, which forms the bed or foundation for the cams which raise the platform or permit it to descend. In the space 78 between said castings 74 the operation of the crank-arms 22, link 23, slotted crank-arm 24, and pull-rod 25 takes place, as in the openings formed in the guide-ribs of the castings 12 or 12ª. These vertically-movable platforms are adapted to be raised or lowered under manipulation of one or two men, and in order to accomplish this they are counterbalanced, the counterbalancing-weights being arranged to fall and thereby assist in the elevation of said platforms, and to rise and consequently prevent the too rapid descent of said platforms when being lowered. To accomplish this purpose, the shafts 8 are provided at intervals with arms 79, provided with counterbalancing-weights 80, which are adapted to swing through a quarter of a circle as they rise or fall. In order that this may be done, as the distance between said shafts and the bottom of the trench at its normal depth is insufficient to accommodate said weights when pendent, holes or cavities (not shown) are made at intervals, of sufficient depth to receive them.

As it may be found of great advantage to weigh the cars as they are received or sent out, I have shown in Fig. 6ª, at one side of the main-line track 3, a second trench, and located therein a platform weighing-scale 81, the detail construction of which is of no consequence in this connection, as any form or type of platform-scale may be employed. This platform-scale of course corresponds in length and width to the car-platforms hereinbefore described, and in its normal position has its upper surface or platform 82 in the plane of the upper surface of the platform 3 when it is depressed, and, furthermore, said scale-platform is provided with transverse tracks or wear-strips 83 in alinement with the rollers 46 of said laterally-movable platforms. By this arrangement it is obvious that after the main-track platform is depressed the platform 84 upon the scale-platform is moved over upon the depressed platform 3, receives the car, and is shifted back upon the scale-platform in order to ascertain the weight of the car and contents. The scale, arranged as shown, is adapted to disclose the result at one side of the car above the building-platform 85, but it is to be understood, of course, and will probably be found more convenient in most cases, to arrange the scale so that the result may be observed at one end of the car and where it will not be in the way of the roustabouts or porters when loading or unloading the car from such platform 85.

It is obvious that the platform 47 may be a scale-supported platform, if desired, and such construction would probably be necessary where the merchant at one side of the alley could not encroach upon the property at the other side. These, however, are matters of detail which could be arranged for mutual convenience of the merchants or dealers using this apparatus.

It is obvious, of course, that by duplicating the platforms 40ª and 43, together with their supporting and operating mechanism, and arranging them side by side and shifting the platform 47 inward another multiple of a car width or car-platform width, provision will be made whereby three cars may be shunted successively into the offset B of the building, and the merchant or dealer thus have three cars at one time at his disposal; and it is furthermore apparent that the number of cars shunted successively into and occupying at the same time a particular space is only limited by the number of these movable platforms, all of which, with the exception of the vertically-movable main platform and the innermost platform 47, which has movement only in a horizontal plane, must be of the duplicate type shown between said platform 47 and the main-track platform. In other words, all of the platforms except those at the extreme ends or sides of the siding, one a vertically-movable platform only and the other a laterally-movable platform only, must consist of both a vertically-movable and laterally-movable platform. This feature, in particular, of this invention is its distinguishing characteristic. It is this only which permits a plurality of cars to be shunted successively in a horizontal plane within a single car length to one side of the main track. The construction embodied in my application referred to in the beginning of this specification is designed to move a single car in a horizontal plane within a single car length laterally upon a depressible main-track platform and back to its original position, but this structure cannot be employed to shift a number of cars to one side, as provided for in this application.

From the foregoing it will be apparent that I have produced an apparatus which is comparatively simple and inexpensive, and which will be found to possess all of the advantages enumerated in the statement of invention, and it is to be understood that structural changes, not involving a departure from the spirit and scope of my invention, may be resorted to.

Having thus described the invention, what I claim as new, and desire to secure by Letters Patent, is—

1. A railway-siding, comprising a depressible platform forming a section normally of a main-line track, a depressible platform arranged parallel with and at the side of the first-named platform, a third platform mounted upon said second depressible platform and adapted when its supporting-platform is not depressed to be moved laterally in a horizontal plane upon the depressed main platform or from its position upon said platform back upon its own supporting-platform, substantially as described.

2. A railway-siding, comprising a depressible platform forming normally a part of a main-line track, a second depressible platform arranged parallel with and by the side of said main-track platform, and a third platform mounted upon said second platform and provided with supporting rollers or wheels, and means to move said platform laterally and in a horizontal plane over upon the depressed main platform, or back upon its own supporting-platform, substantially as described.

3. A railway-siding, comprising a depressible platform forming normally a part of a main-line track, a depressible supporting-platform arranged parallel with and by the side of said main-track platform, but adapted to occupy a lower horizontal plane when depressed, a third platform upon said supporting-platform and adapted when depressed to occupy the plane of the main-track platform when depressed, and a fourth platform located at the opposite side of and parallel with said third platform and occupying at all times the same horizontal plane as said third platform and the main platform when they are elevated, substantially as described.

4. A railway-siding, comprising a depressible platform forming normally a part of a main-line track, a depressible supporting-platform arranged parallel with and by the side of said main-track platform, but adapted to occupy a lower horizontal plane when depressed, a third platform upon said supporting-platform and adapted when depressed to occupy the plane of the main-track platform when depressed, a fourth platform located at the opposite side of and parallel with said third platform and occupying at all times the same horizontal plane as said third platform and the main platform when they are elevated, and means whereby said last-named or fourth platform may be moved in a horizontal plane and at right angles across the depressed third platform and upon the depressed main platform, so as to form temporarily a continuation of the main-line track, and means to return said platform to its original position, substantially as described.

5. In a railway-siding, the combination with a depressible platform forming normally a continuation or section of a main-line track, a second depressible and supporting platform arranged parallel with and at one side of said main-track platform, a third platform provided with longitudinal tracks and resting upon said supporting-platform, rods projecting from the ends of said platform, and endless chains for moving said platform back and forth in a horizontal plane when the main platform is depressed, and having a positive but sliding connection with said rods, whereby the lateral movement or vertical movement of said platform may take place independently of the other, substantially as described.

6. In a railway-siding, the combination with a depressible platform, forming normally a continuation or section of a main-line track, of a weighing-platform at one side of the same, and a platform which may be shifted laterally from the weighing-platform onto the main-track platform when depressed, and back to its original position, for the purpose set forth.

In testimony whereof I affix my signature in presence of two witnesses.

WALLACE R. KIRK.

Witnesses:
M. R. REMLEY,
J. E. HIGDON.